(No Model.) 3 Sheets—Sheet 1.

R. C. PENFIELD & W. W. WALLACE.
BRICK OR TILE CUTTING MACHINE.

No. 551,690. Patented Dec. 17, 1895.

Witnesses.
E. B. Gilchrist

Inventors
Raymond C. Penfield
and
William W. Wallace
By M. D. Leggett & Co,
Attorneys.

(No Model.) 3 Sheets—Sheet 2.

R. C. PENFIELD & W. W. WALLACE.
BRICK OR TILE CUTTING MACHINE.

No. 551,690. Patented Dec. 17, 1895.

WITNESSES:
E. B. Gilchrist

INVENTORS
Raymond C. Penfield
William W. Wallace
By M. D. Leggett & Co.
Attorneys.

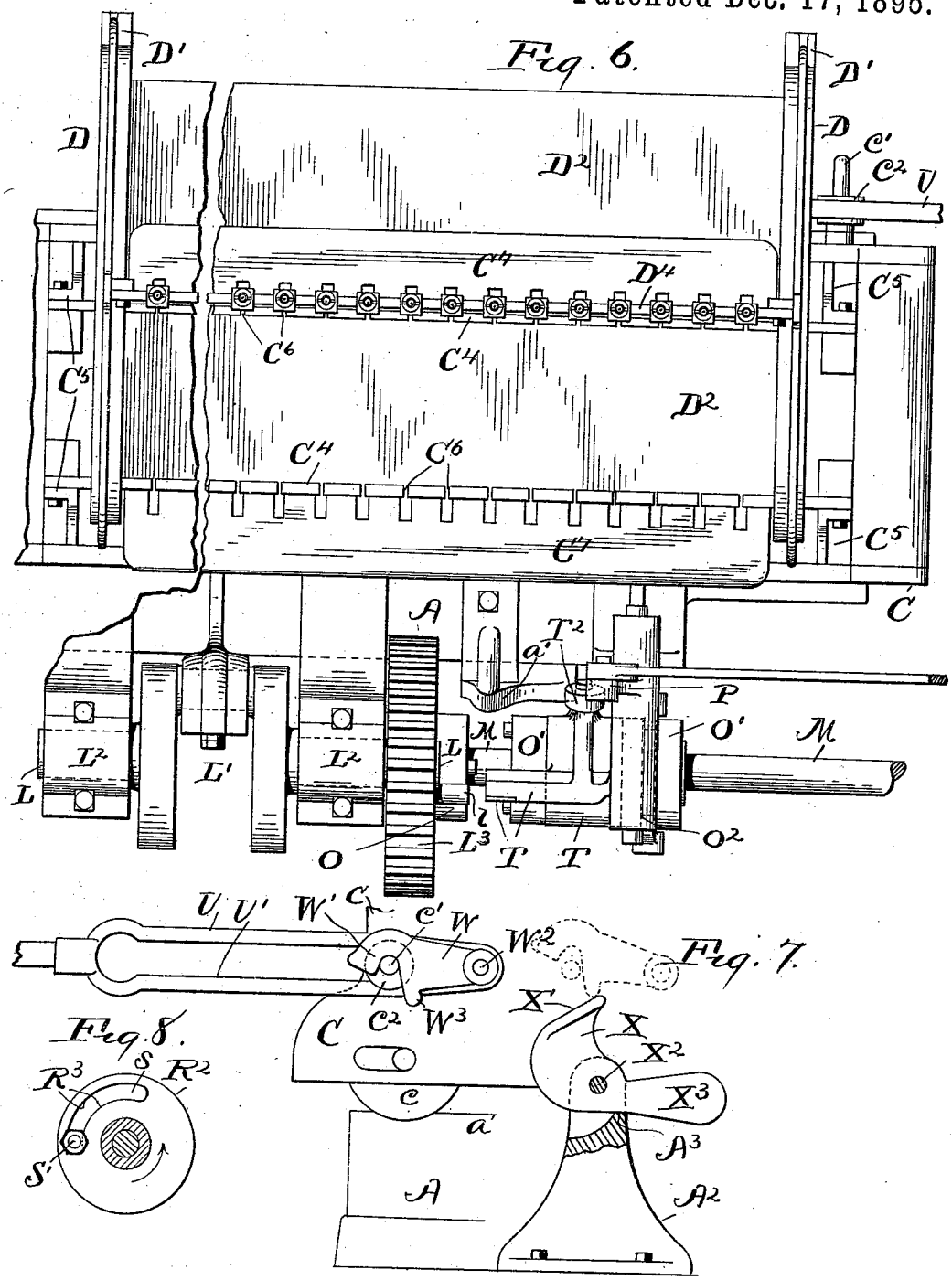

UNITED STATES PATENT OFFICE.

RAYMOND C. PENFIELD AND WILLIAM W. WALLACE, OF WILLOUGHBY, OHIO, ASSIGNORS TO J. W. PENFIELD & SON, OF SAME PLACE.

BRICK OR TILE CUTTING MACHINE.

SPECIFICATION forming part of Letters Patent No. 551,690, dated December 17, 1895.

Application filed June 22, 1895. Serial No. 553,685. (No model.)

*To all whom it may concern:*

Be it known that we, RAYMOND C. PENFIELD and WILLIAM W. WALLACE, of Willoughby, in the county of Lake and State of Ohio, have invented certain new and useful Improvements in Brick or Tile Cutting Machines; and we do hereby declare the following to be a full, clear, and exact description of the invention, such as will enable others skilled in the art to which it pertains to make and use the same.

Our invention relates to improvements in brick and tile cutting machines; and it consists more especially in a machine of the variety indicated that is adapted to receive the column, bar or slab of clay issuing from the brick or tile machine, and to automatically cut the same into pieces of the proper size.

One object of our present invention is to provide improved means for moving the severing-wire carriage longitudinally—that is, in the direction of the path of the moving bar or column of clay—during the severing operation and for returning said carriage into position for the next succeeding operation.

Another object of our invention is to provide improved means for effecting the operation of the severing-wires during the movement of the severing-wire carriage in unison with the traveling bar or column of clay.

In addition to the construction and combinations of parts necessarily employed for attaining the objects hereinbefore enumerated our invention also consists in certain features of construction and combinations of parts hereinafter described, and pointed out in the claims.

In the accompanying drawings is exhibited a preferable construction of machine embodying our invention.

Figure 1:
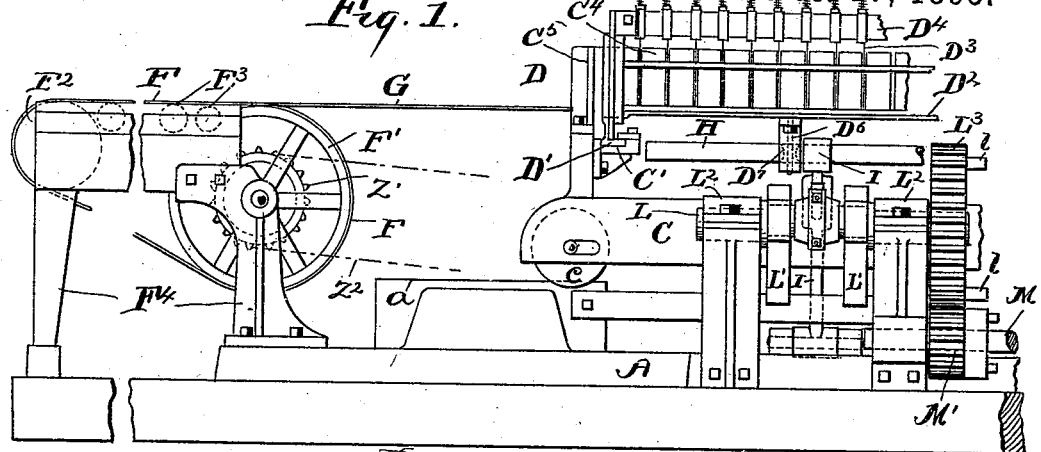
Figure 2:
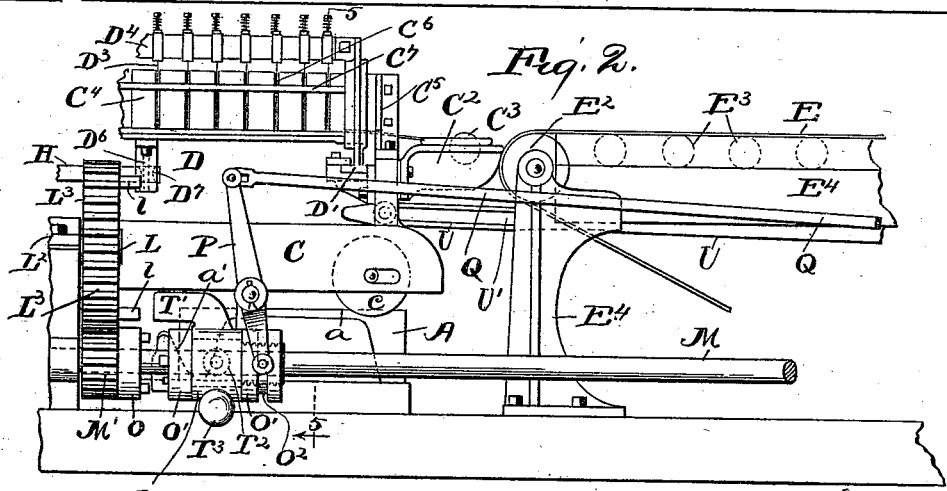
Figure 3:
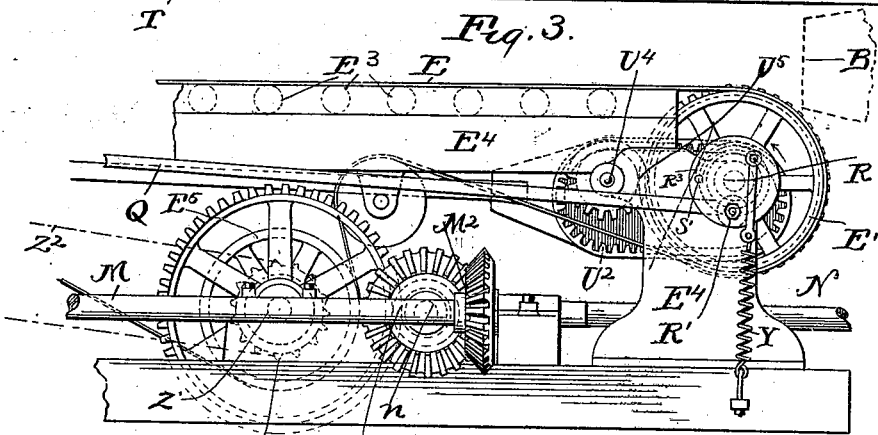
Figure 4:
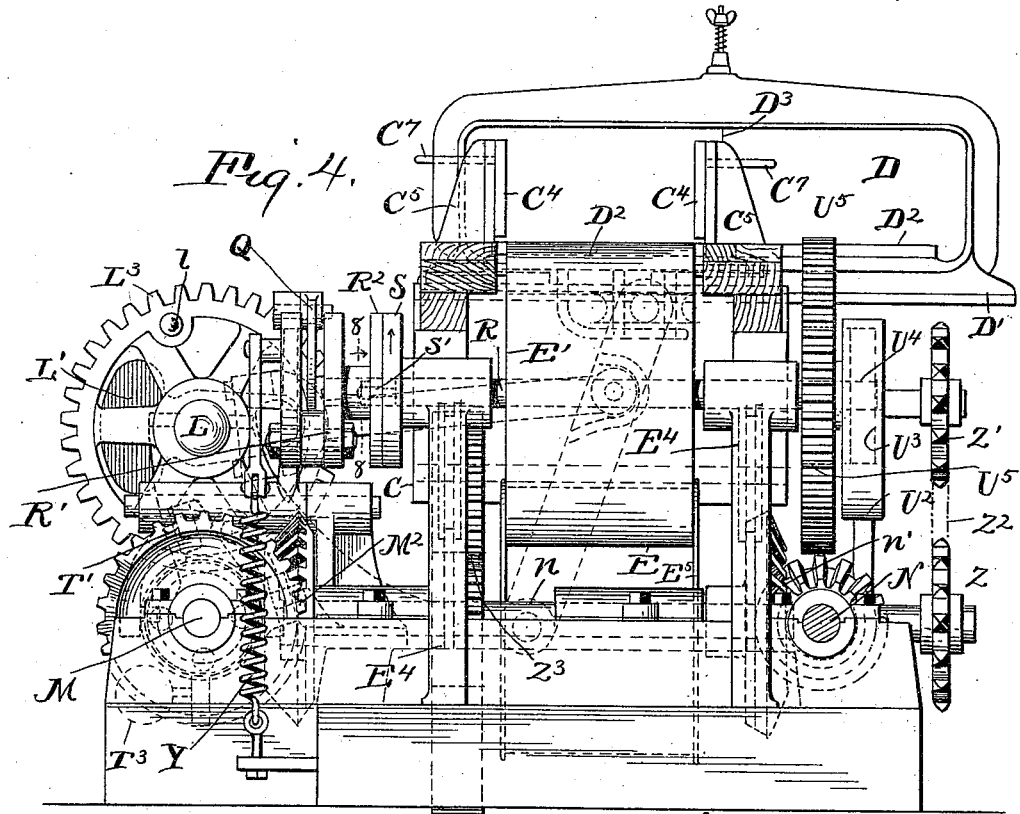
Figure 5:
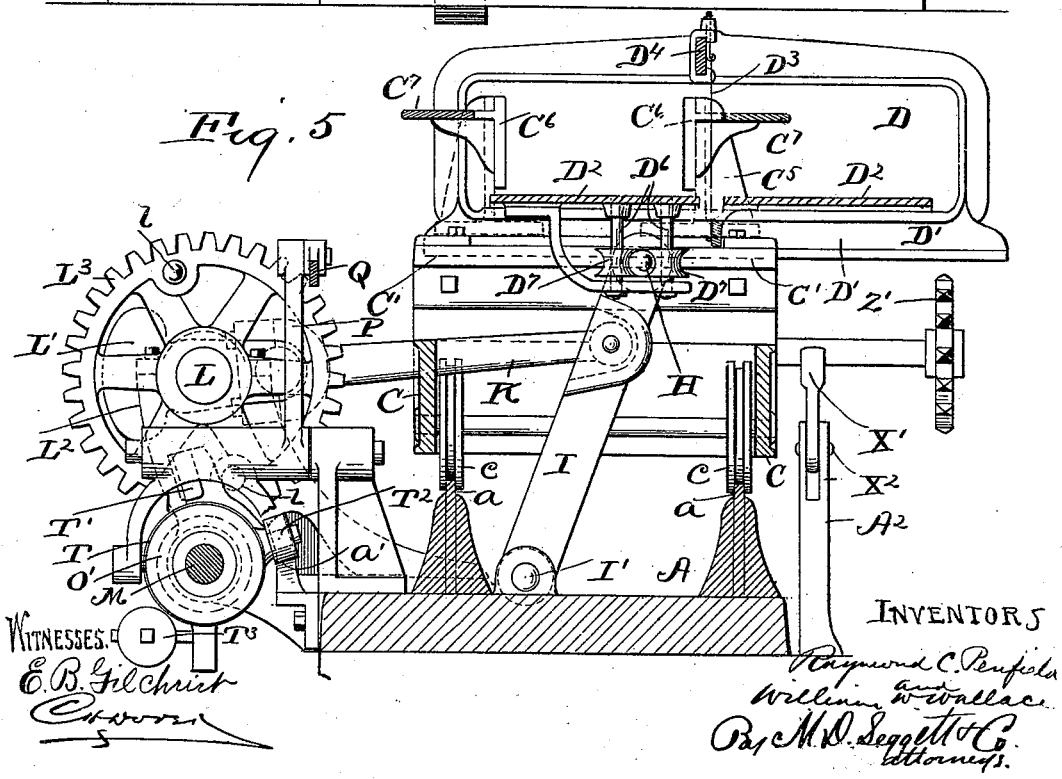

Figures 1, 2, and 3 are elevations of the same side of the machine, portions being broken away in Fig. 1 to reduce the size of the figure. Figs. 1 and 3 are elevations of opposite end portions of the machine, respectively, and Fig. 2 is an elevation of the central portion of the machine. The discharging-mouth of the brick or tile machine is shown in Fig. 3. Fig. 4 is an end elevation of the machine, showing that end that is located next to the brick or tile machine. Fig. 5 is a vertical section on line 5 5, Fig. 2, looking in the direction of the arrow. Fig. 6 is a top plan of a portion of the machine, showing the severing-wire carriage and portions of the mechanism employed in effecting the movement of said carriage longitudinally in unison with the moving column or bar of clay and the means employed in effecting the operation of the severing-wires, a portion of the severing-wire carriage being broken away to show both ends of said carriage. Fig. 7 is a side elevation, partly in section, of a portion of the means employed in effecting the longitudinal movement of the severing-wire carriage with the traveling column or bar of clay. Fig. 8 is a section on line 8 8, Fig. 4.

Referring to the drawings, A designates the stationary supporting-frame of our improved cutting-machine that is shown located in suitable proximity to the discharging mouth or die B of a brick, tile or clay product machine. A longitudinally-movable frame C is suitably mounted upon stationary frame A, frame C being preferably provided with wheels or rollers $c$ that engage rails or guides $a$ rigid with frame A and arranged parallel with frame C. Frame C is adapted to reciprocate endwise of rails or guides $a$. Frame C bears the severing-wire carriage D and is capable of movement longitudinally in the direction of the traveling bar, slab or column of clay, as required, during the severing operation to obtain a straight cut. The severing-wire carriage is capable of reciprocating transversely of frame C—that is, at right angles to the path of the traveling bar or column of clay—said carriage, at the bottom and at each end, being provided with a slide D' that engages a slideway C' arranged upon and transversely of frame C. Frame C, at its forward or receiving end, is provided with an arm or extension $C^2$ that is adapted to extend to within a suitable distance of the discharging end of an endless belt or apron E employed to convey the moving bar or column of clay from the brick or tile machine to one of two platens or tables $D^2$ borne by the severing-wire carriage, said extension $C^2$ of frame C bearing roller $C^3$, upon and over which the bar or column of clay passes on its way to the respective platen or table of the severing-wire carriage, from which table or platen the moving slab or column of clay passes onto an off-bearing belt F, to which motion is communicated as hereinafter described.

The machine illustrated is what is known as an "end-delivery" machine—that is, a machine wherein the severed pieces of clay are pushed from the delivering end of the respective platen or table by the moving bar, slab or column of clay onto an off-bearing and separating belt or apron F.

Apron or belt E leads over rollers E' E² located at opposite ends of the belt, respectively, and over intermediate rollers E³, said rollers and belt being suitably supported by framework E⁴.

Apron or belt F leads over rollers F' F², located at opposite ends of the belt, respectively, and over intermediate rollers F³, said rollers and belt being suitably supported by framework F⁴.

Frame C, at the delivering end of the severing-wire carriage, is provided with a plate G that projects outwardly and overlaps the adjacent portion of the off-bearing and separating belt, thereby bridging the space between said belt and the delivering end of the respective bed-plate or table of the severing-wire carriage, as required, in order to prevent the dropping of the severed pieces of clay in their passage from the respective table or bed-plate of the severing-wire carriage to the off-bearing belt.

We would here remark that when the portion of the traveling bar, column, or slab of clay to be severed into pieces is in position upon the respective platen or table of the severing-wire carriage the latter is automatically actuated to cause the severing-wires D³, with which said carriage is provided, to cut laterally through the moving bar, slab, or column of clay, as required, and we would also remark that frame C, that bears the severing-wire carriage, is moved longitudinally during the severing operation in unison with the moving bar or column of clay, and we would further remark that when the section of the moving bar, slab, or column of clay to be severed has been cut into pieces by the severing-wires, said cut section of the column or bar of clay is pushed from off the respective platen or table of the severing-wire carriage onto the off-bearing and separating belt by the next succeeding uncut portion of the traveling bar or column of clay.

In the machine illustrated the severing-wires are adapted to cut with each reciprocation of the severing-wire carriage, and the severing-wire carriage is provided with two tables or platens D², as shown in Figs. 5 and 6, which platens or tables are located in the same horizontal plane and a suitable interval apart, and are adapted to receive, alternately, the section of the moving bar or column of clay to be cut into pieces.

The severing-wire carriage comprises, preferably, two vertically-arranged O-shaped members located, respectively, at opposite ends of the carriage, and said O-shaped members at their bottoms terminate in slides D', hereinbefore referred to. Said O-shaped members of the severing-wire carriage at their top and central portions are connected with each other by a bar D⁴. The clay-receiving tables or platens D² of the severing-wire carriage are suitably secured to said O-shaped members and extend from one O-shaped member to the other, and the severing-wires are suitably stretched from bar or member D⁴ downwardly to the bottom of the severing-wire carriage and are fastened at their lower ends in any approved manner, preferably to one of the platens or tables of said carriage.

Longitudinally-moving frame C is provided with two vertically-arranged plates or guide-bars C⁴, that are located a suitable distance apart above the horizontal plane in which platens or tables D² are situated, and are suitably secured to upright arms or brackets C⁵ that are rigid with frame C. Upright plates or guide-bars C⁴ of frame C face each other, as shown in Figs. 4 and 5, and the two tables or platens D² of the severing-wire carriage are simultaneously moved during the severing operation in under plates or bars C⁴ respectively—that is, one platen or table D² is adapted to move under the one plate or bar C⁴ and the other table or platen D² is adapted to move under the other plate or bar C⁴. One of the tables or platens D² is always in position to receive the section of the moving bar or column of clay to be severed into pieces, and while one of said platens or tables is receiving the incoming bar or column of clay the other table or platen is in position conveniently to be cleaned—that is, for removing any bits of clay adhering to said platen or table. The arrangement and operation of parts are such that the platen or table that bears the clay to be severed into pieces shall, during the severing operation, move in under bar or plate C⁴ that is located at that side of the machine in the direction of which the clay-bearing table or platen is moved, so that said plate or bar C⁴ shall push or force the severed pieces of clay, during said movement of the clay-bearing platen or table, from off said table or platen onto the other platen or table of the machine, bringing the platen or table, that has just been unloaded, into position to be cleaned, and the severed pieces of clay are pushed from off the platen or table to which they have been delivered, as just described, onto the off-bearing belt by the next succeeding uncut portion of the moving bar or column of clay. Bars or plates C⁴ are, of course, slotted laterally and vertically, as at C⁶, (see Fig. 6,) to receive the severing-wires at the end of the severing operation, and are preferably reinforced on their outer side by a rib C⁷.

The O-shaped members at the ends of the severing-wire carriage are, of course, of such size that they shall accommodate the passage through them of the moving bar, column or slab of clay.

The severing-wire carriage, as already indicated, is adapted to reciprocate transversely of the path of the moving bar, column or slab of clay in the operation of the machine, and the severing-wires of said carriage, in the machine illustrated, are adapted to cut with each reciprocation of the carriage. Said carriage is automatically actuated, and the improved means or mechanism that we have devised for reciprocating or operating said carriage to move the severing-wires laterally in order to cut the bar or column of clay into pieces is as follows: The severing-wire carriage, at the bottom, below the plane in which its tables or platens are located, is provided with two pairs of downwardly-projecting studs $D^6$, (see Figs. 1, 2, 4 and 5,) said pairs of studs being located a suitable distance apart and each stud being provided with a horizontally-arranged grooved wheel or roller $D^7$. A rod or shaft H, arranged longitudinally of the machine, is suitably supported within the grooved peripheries of said grooved wheels or rollers that afford bearing for said rod or shaft and allow the latter to move endwise. Rod or shaft H, near its central portion, is suitably connected with a lever I that is fulcrumed at its lower end, as at I', to the supporting-frame of the machine.

Lever I, at any suitable point between its fulcrum and upper end, is operatively connected, by means of a link or pitman K, with the crank L' of a crank-shaft L that is arranged lengthwise of the machine, and has bearing in suitable boxes $L^2$ rigid with stationary frame A. By the construction just described it will be observed that the severing-wire carriage is moved in the one direction during the one half of each rotation of the crank-shaft, and is moved in the opposite direction during the remaining half of the rotation of said shaft. Means for automatically giving said shaft a half-turn at a time is provided, and is shown to be as follows: Arranged longitudinally of the machine, below the aforesaid crank-shaft and parallel with and in the same vertical plane as the crank-shaft, is a rotating shaft M that is supported in any approved manner, and is provided with a gear M' (see Fig. 2) loosely mounted on the shaft and meshing with a gear $L^3$ operatively mounted upon the crank-shaft. Shaft M extends along one side of the framework $E^4$ (that bears conveying belt or apron E) in the direction of the receiving end of belt or apron E, and is intergeared, as at $M^2$, with a shaft n (see Figs. 3 and 4) that is suitably supported and arranged transversely of the machine, and is intergeared at its opposite end, as at n', with the driving-shaft N, to which motion is communicated in any approved manner, the driving-shaft, in the case illustrated, being arranged parallel with shaft M. A clutch is employed for establishing operative connection between gear M' and its supporting-shaft, and consequently between the two shafts L and M. One of the clutch members O is rigid or operatively connected with gear M', and the other member O' of the clutch is operatively and slidably mounted upon shaft M. The slidable clutch member is annularly grooved, as at $O^2$, and has its groove engaged by the fork of a forked lever P that is fulcrumed at or near its central portion to a member of the supporting-frame and at its upper end is operatively connected by means of a link or connecting-rod Q with the wrist of a crank-wheel or crank R' (see Figs. 3 and 4) that is loosely mounted upon the shaft R that bears roller E' at the receiving end of conveying belt or apron E. Said crank-wheel or crank is rigid or operatively connected with a wheel or disk $R^2$, also loosely mounted upon supporting-shaft R and provided with a groove or slot $R^3$ (see also Fig. 8) arranged concentric with the shaft and engaged by a pin or member S' projecting laterally from a wheel or disk S operatively mounted upon said shaft, all whereof will be hereinafter more fully explained.

Means for automatically interrupting operative connection between clutch members O and O', and consequently between the two shafts L and M, upon each half-rotation of the crank-shaft (that is, upon the completion of each severing operation) is provided, and the means employed for the purpose is preferably as follows:

Gear $L^3$, at the side adjacent to the clutch, is provided with two laterally-projecting pins or lugs l that are located diametrically opposite each other and preferably near the periphery of the gear. Said lugs or pins are adapted to engage the forward side of an upwardly-projecting lug or member T' formed upon a collar T that is loosely mounted upon the slidable member of the clutch. Said collar, at the rear or inner side, is provided with a roller $T^2$, (see Figs. 5 and 6,) that is adapted to engage and ride down an incline a' formed upon a member of the stationary supporting-frame, the trend of said incline being downwardly in the direction of the receiving end of the cutting-machine. Collar T is provided with suitable means—such, for instance, as a weight $T^3$—that acts to retain the collar in a position holding the aforesaid incline-engaging roller in its elevated or normal position.

The parts of the severing-wire-carriage actuating mechanism are so arranged and timed that a half-rotation of gear $L^3$ shall effect one operation of the severing-wires—that is, the severing-wires are caused to reciprocate twice in opposite directions, respectively, during one complete rotation of said gear—and the arrangement of parts is further such that, when operative connection is established between clutch members O and O', roller $T^2$ of collar T shall be opposite the upper end of incline a', and so that at the end of each severing operation one of the laterally-projecting pins or lugs of gear L³ shall come into engagement with upwardly-projecting lug T' of roller-bearing collar T and oscillate said collar in the direction required to cause the roller thereof to ride down incline a', resulting in the separation of the slidable clutch member from the companion clutch member, and consequently automatically interrupting operative connection between the severing-wire carriage and shaft M. To insure a perfectly straight cut, it is obvious that frame C, that bears the severing-wire carriage, must move longitudinally in unison with the traveling column, bar, or slab of clay; and one object of our present invention, as already indicated, is to provide improved means for actuating said frame, and the means employed for the purpose is shown to be as follows: Said frame at one side, in the present instance the side opposite the location of the mechanism employed to establish operative connection between the severing-wire carriage and shaft M, is provided with a laterally-projecting roller-bearing pin or lug c', the roller c² whereof engages an elongated longitudinally and horizontally arranged slot U' (see Fig. 7) in one end of a connecting rod or link U that extends toward the receiving end of the clay-conveying belt or apron E, and, at its opposite end, (see Figs. 3 and 4,) terminates in an oblong and longitudinally-arranged internal gear U², that meshes with a pinion U³, operatively mounted upon a shaft U⁴, that is arranged transversely of frame E⁴, parallel with roller E', and is suitably intergeared, as at U⁵, with the shaft that bears said roller, the relative size of the gears being such as to communicate the desired velocity of motion to longitudinally-reciprocating rod or link U. Frame C is moved longitudinally in the one direction or the other, according as rod or link U is moved in the one direction or the other.

Connecting-rod U, at its slotted end, (see Fig. 7,) is provided with an oscillating latch W whose hook end W' is adapted to engage a lug or pin c' and thereby lock rod or link U to frame C. Latch W is pivoted to link or rod U at W² and has a depending arm or member W³ that is adapted to engage and ride up an incline X' formed upon an oscillating upright arm or member X pivoted, at its lower end, as at X², to any stationary member—such, for instance, as an upright standard A² rigid with frame A—the trend of said incline being upwardly in the direction of the delivering end of the cutting-machine, and the arrangement of parts being preferably such that during the movement of frame C, upon the completion of the severing operation, the depending arm or member of latch W shall ride up said incline X' and effect the disengagement of the latch from the lug or pin that bears roller c², as shown by dotted lines in Fig. 7, and consequently interrupt operative connection between frame C and the aforesaid actuating rod or link, and the said rod or link thereupon operates idly until after the elongated slot in said link or rod has moved its entire length in opposite directions and until frame C, during the return movement of said frame, preparatory to the next succeeding severing operation, shall have been locked to the connecting rod or link by the engagement of the locking-latch with the same roller-bearing pin, the elongated longitudinal slot in the actuating rod or link accommodating the movement of the next succeeding section of the traveling column or bar of clay upon the respective table or platen of the severing-wire carriage preparatory to the next succeeding severing operation. A stop to limit or prevent the oscillation of upright arm X in the direction of the delivering end of the cutting-machine is provided and consists, preferably, of a shoulder A³ formed upon the stationary member A² and adapted to be engaged by the weight attached to member X' and thereby limit the oscillation of said arm in the direction indicated. The capability of said incline-bearing member to oscillate in the opposite direction—that is, in the direction of the receiving end of the machine—accommodates the return movement of the depending arm of latch W past said incline-bearing member.

Referring again to the wheel or disk R² that is provided with the concentric groove or slot R³, and that has operatively connected thereto the actuating-crank of the mechanism employed to throw the slidable clutch member O' into operative engagement with its companion member and thereby establish operative connection between the severing-wire carriage and driving machinery, and which slot or groove is engaged by the laterally-projecting pin S' of a wheel or disk S that is operatively mounted upon the shaft that loosely bears the aforesaid crank and grooved or slotted disk, we would remark that said parts rotate in the direction of the arrows in Figs. 3, 4 and 8, and there is employed a spring Y, or its equivalent, to act in the direction required to rotate slotted or grooved wheel or disk R² and the crank connected therewith a distance equal to the length of the slot or groove in said disk or wheel, so that pin-bearing disk or wheel S shall operate idly for a time until the pin of said disk S has again come into engagement with that end wall of the slot or groove R³ that is engaged by said pin in the actuation of the disk R² in unison with disk S, and the parts are so arranged and timed that the idle movement of disk S shall take place immediately upon the interruption of operative connection between the severing-wire carriage and driving machinery, and during the time that the next section of the traveling bar or column of clay shall pass upon the respective table or platen of said carriage preparatory to the next succeeding severing operation and so that said disk S shall again operate the actuating-crank of the slidable clutchmember-actuating mechanism and effect operative connection between the severing-wire carriage and driving machinery as soon as the section of the moving bar or column of clay referred to has come into position to be severed into pieces.

Rod or shaft H of the mechanism for reciprocating the severing-wire carriage transversely of the path of the moving bar or column of clay, of course, has the length required to accommodate the longitudinal movement of said carriage with frame C.

Conveying belt or apron E is driven by the friction had between the same and the moving bar or column of clay; but the same may be more positively driven by operatively connecting it with the driving machinery, for instance, by having the apron or belt operatively engaged by a pulley $E^5$ that may be operatively connected by a suitable system of gearing or shafting, belting and pulleys (not shown) with the driving-shaft.

The off-bearing belt or apron F is driven in any suitable manner at a speed so much greater than that of the moving bar or column of clay as to separate the severed pieces of clay a suitable distance upon their delivery to the off-bearing and more rapidly-speeded belt. The off-bearing belt is preferably operatively connected with shaft Z by means of sprocket-wheels and chain $Z'$ $Z^2$, respectively, which shaft Z is shown intergeared at $Z^3$ with shaft $n$.

The machine illustrated is designed to cut with each reciprocation or transverse movement of the severing-wire carriage, and the arrangement of parts is such that the severing-wires shall, at the end of each severing operation, be in position at the outer side of one of the guide-bars $C^4$, and shall, in the actuation of the same to cut, be carried from the outer side of the one guide-bar through and beyond the outer side of the oppositely-located guide-bar. The size of roller or pulley $E'$ should also be such that the distance measured about its circumference shall be equal or approximately equal with the length of the clay-receiving tables or platens $D^2$, so that the moving bar or column of clay shall come into position upon one of said platens or tables with each rotation of said pulley or roller.

Concluding, we would remark that the operation of the machine, briefly described, is as follows: The column or bar of clay discharged by the brick or tile machine is received by belt or apron E, and by the latter is conveyed to one of the tables or platens of the severing-wire carriage. Longitudinally-moving frame C, and the severing-wire carriage borne thereby, in their normal position preparatory to the severing operation, are nearest to said belt or apron. As soon as the incoming column or bar of clay reaches the farther or delivering end of the respective table or platen of the severing-wire carriage, which it does upon each complete rotation of roller or pulley $E'$, frame C and the severing-wire carriage borne thereby are moved longitudinally in unison with the moving bar or column of clay, and the severing-wire carriage, simultaneously with its said longitudinal movement, is moved transversely of the path of the moving bar or column of clay, resulting in the operation of the severing-wires and in a perfectly straight cut, and, upon the completion of the severing operation, frame C and the severing-wire carriage borne thereby are returned into their position nearest the apron or belt and held in such position until the incoming bar or column of clay shall again have reached the farther or delivering end of the respective table or platen of the severing-wire carriage, whereupon the longitudinal movement of said frame and carriage in unison with the moving bar or column of clay and the accompanying transverse movement of the severing-wire carriage are repeated. All the operations are automatic. The severing-wires cut with each transverse movement of the severing-wire carriage, and the two tables or platens of said carriage alternately receive the section of the column or bar of clay to be severed in pieces.

What we claim is—

1. In a brick and tile-cutting machine, in combination, a stationary frame, severing-wire-carriage, a longitudinally-movable frame bearing the severing-wire-carriage and arranged in line with the path of the moving bar or column of clay, a suitably actuated apron or belt for delivering the column or bar of clay to the longitudinally-movable frame, suitable mechanism for actuating the severing-wire-carriage to cause the latter to perform its function, a pinion $U^3$ operatively connected with said belt or apron, an oblong internal gear $U^2$ meshing with said pinion, rod or link U rigid with said internal gear and extending from said gear to one side of the aforesaid longitudinally-movable frame and slotted longitudinally, as at $U'$, a laterally-projecting member on said movable frame engaging the aforesaid slot, a latch borne by the aforesaid rod or link and adapted to engage said projecting-member of the movable frame and lock the same to the link or rod, and suitable means for automatically actuating said latch to unlock, all arranged and operating substantially as shown, for the purpose specified.

2. In a brick and tile-cutting-machine, in combination, a stationary frame, severing-wire-carriage, a longitudinally-movable frame bearing the severing-wire-carriage and arranged in line with the path of the moving bar or column of clay to be cut into pieces, a suitably actuated apron or belt for delivering the column or bar of clay to the longitudinally-movable frame, suitable mechanism for actuating the severing-wire-carriage to cause the latter to perform its function, a pinion $U^3$ operatively connected with said belt or apron, an oblong internal gear $U^2$ meshing with said pinion, rod or link U rigid with said internal gear and extending from said gear to one side of the aforesaid longitudinally-movable frame and slotted longitudinally, as at U', a laterally-projecting member on said movable frame engaging the aforesaid slot, a latch borne by the aforesaid rod or link and adapted to engage said projecting-member of the movable frame and lock the same to the link or rod, and an incline-bearing-arm X pivoted to any stationary member, said arm being free to oscillate in the direction of the receiving-end of the cutting-machine, and a stop for limiting the oscillation of said arm in the opposite direction, the parts being arranged substantially as shown, for the purpose specified.

3. In a brick and tile-cutting-machine, the combination of a suitably-supported longitudinally movable frame arranged in line with the path of the moving bar or column of clay, severing-wire-carriage borne by said longitudinally movable frame and adapted to be actuated transversely of the path of the bar or column of clay, a suitably-actuated apron or belt for conveying the bar or column of clay to the place of cutting, suitable mechanism for actuating the longitudinally movable frame in unison with the moving column or bar of clay during the severing-operation, crank-shaft L operatively connected with the severing-wire-carriage, gear $L^3$ operatively mounted upon said shaft, suitably-actuated shaft M, gear M' loose upon said shaft M, said gear M' meshing with the gear on the crank-shaft and provided with two laterally-projecting lugs or pins $l$ arranged diametrically opposite each other, a clutch upon shaft M for establishing operative connection between the two shafts, one member of the clutch being borne by the aforesaid loosely mounted gear and the companion clutch-member being operatively and slidably mounted upon the shaft, means for automatically-actuating the slidable clutch-member into operative engagement with the companion clutch-member, a collar loosely mounted upon the movable clutch-member and provided with a lug or arm T', means acting to retain said collar in its normal position, and the stationary incline $a'$, the trend of said incline and the arrangement of parts being substantially as shown, for the purpose specified.

4. In a brick and tile-cutting-machine, the combination of a suitably-supported longitudinally-movable frame arranged in line with the path of the moving-column or bar of clay, severing-wire-carriage D provided with two horizontally-arranged platens or tables $D^2$, suitable means for actuating said longitudinally-movable frame in unison with the moving bar or column of clay, a suitably-actuated apron or belt for conveying the bar or column of clay to one of the aforesaid tables or platens, a roller or pulley E' engaging the receiving-end of said belt or apron, the diameter of said pulley or roller being such that the distance measured about the circumference of the roller or pulley shall be equal or approximately equal to the length of the aforesaid clay-receiving tables or platens, crank-shaft L operatively connected with the severing-wire-carriage in such a manner that the carriage shall be moved transversely with each half turn of the shaft, gear $L^3$ operatively mounted upon said shaft, suitably-actuated shaft M and gear M' loose upon said shaft, said loosely-mounted gear meshing with the aforesaid gear on the crank-shaft, clutch for establishing operative connection between the two shafts, the one member of the clutch being borne by the aforesaid loosely mounted gear and the other member of the clutch being operatively and slidably mounted upon shaft M, mechanism operatively connecting the movable clutch-member with the aforesaid belt-engaging pulley or roller, said mechanism being connected with said roller or pulley in such a manner as to effect operative connection between the clutch-members once during each rotation of said roller or wheel, and suitable means for automatically interrupting said operative connection with each half turn of the aforesaid crank-shaft, the parts being arranged and timed substantially as and for the purpose set forth.

5. In a brick and tile-cutting-machine, the combination of a suitably-supported longitudinally-movable frame arranged in line with the path of the moving-column or bar of clay, severing-wire-carriage borne by said longitudinally-movable frame and adapted to be actuated transversely of the path of the bar or column of clay, means for moving said longitudinally-movable frame in unison with the moving bar or column of clay, a suitably-actuated apron or belt for conveying the bar or column of clay to the place of cutting, roller or pulley E' engaging the receiving-end of said belt or apron and its supporting-shaft R, crank-shaft L operatively connected with the severing-wire-carriage in such a manner that the carriage shall be moved transversely with each half turn of the shaft, gear $L^3$ operatively mounted upon said shaft, suitably-actuated shaft M, gear M' loose upon said shaft M and meshing with gear $L^3$, clutch for establishing operative connection between the two shafts, the one member of the clutch being borne by the aforesaid loosely mounted gear and the other clutch-member being operatively and slidably mounted upon the shaft, two wheels or disks $R^2$, S, one whereof is operatively mounted upon the shaft that bears the aforesaid belt-engaging roller or pulley, and the other disk or wheel being loosely mounted upon the shaft, one of said disks or wheels being provided with a slot or elongated hole $R^3$ concentrically arranged, and the other wheel or disk being provided with a laterally-projecting pin or member S' engaging said slot or hole, a crank R' operatively connected with the loosely mounted wheel or disk, said crank being operatively connected with the movable clutch-member of the aforesaid clutch substantially as indicated, and the spring or its equivalent, Y, all arranged and operating substantially as shown, for the purpose specified.

In testimony whereof we sign this specification, in the presence of two witnesses, this 15th day of November, 1894.

RAYMOND C. PENFIELD.
WILLIAM W. WALLACE.

Witnesses:
J. W. PENFIELD,
J. A. GREEN.